Sept. 10, 1957  E. E. SELBY  2,805,887
TRACTOR CANOPY GUARD AND COMBINATION
Filed Feb. 10, 1956  2 Sheets-Sheet 1
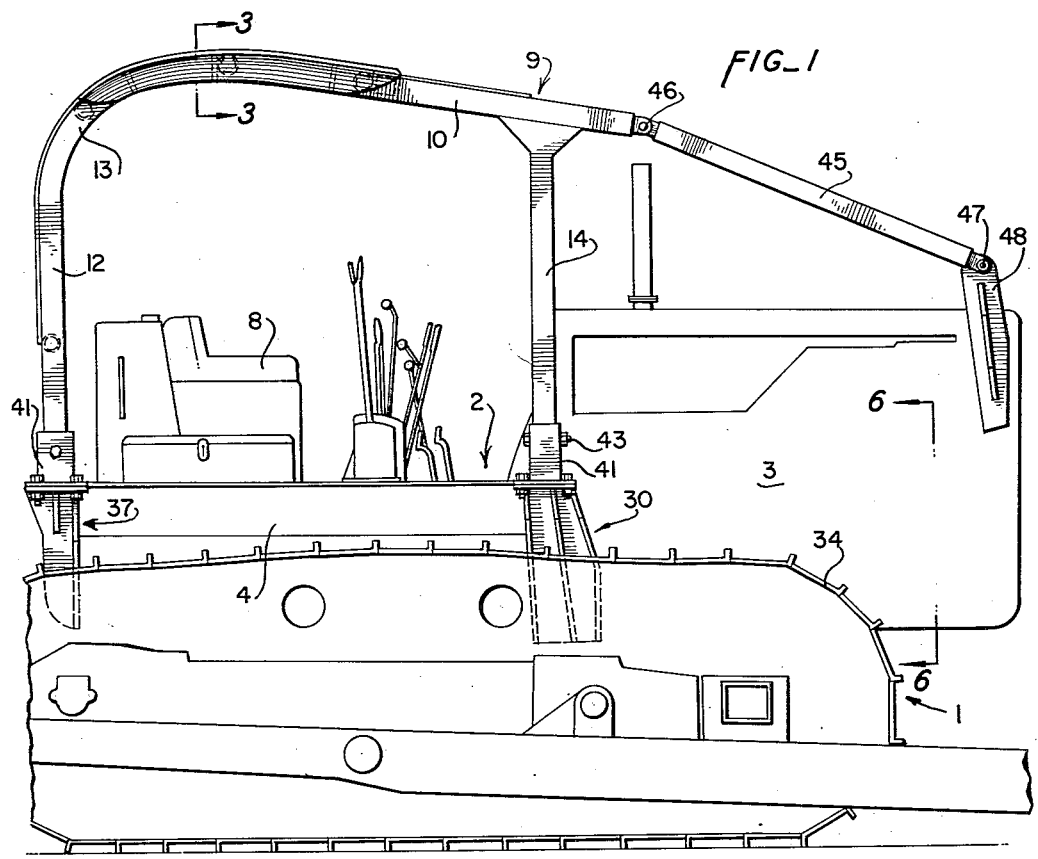
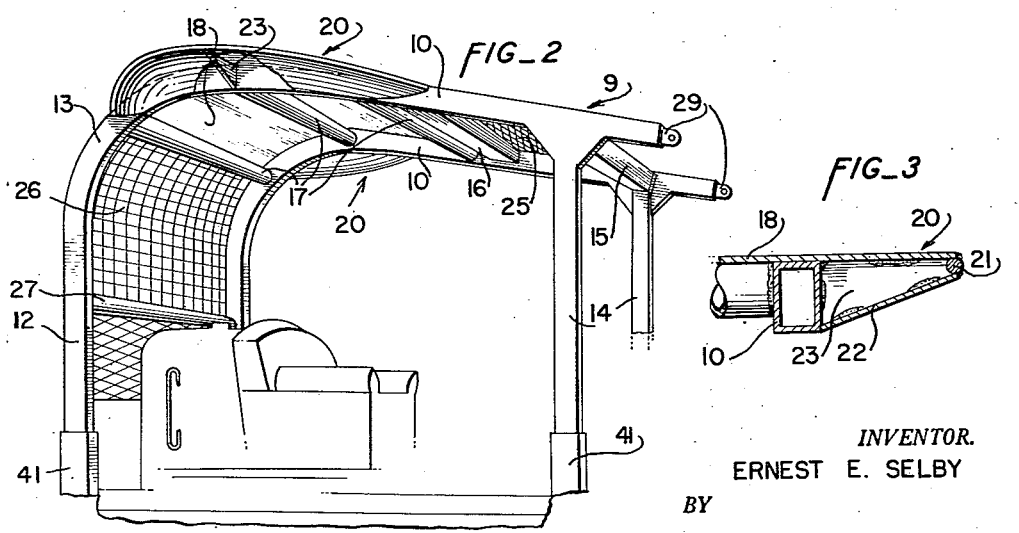
INVENTOR.
ERNEST E. SELBY
BY
ATTORNEYS Sept. 10, 1957  E. E. SELBY  2,805,887
TRACTOR CANOPY GUARD AND COMBINATION
Filed Feb. 10, 1956  2 Sheets-Sheet 2
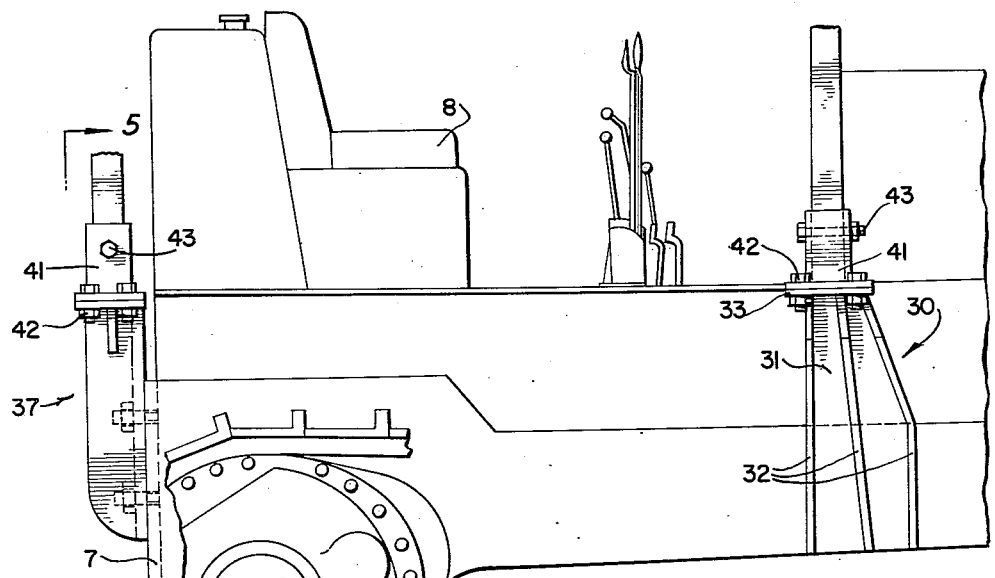
FIG_4
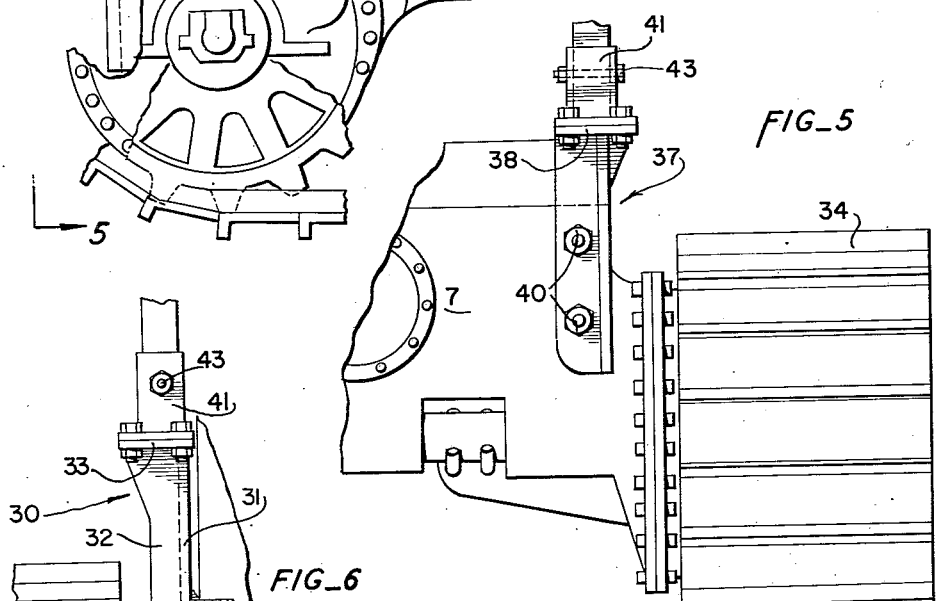
FIG_5
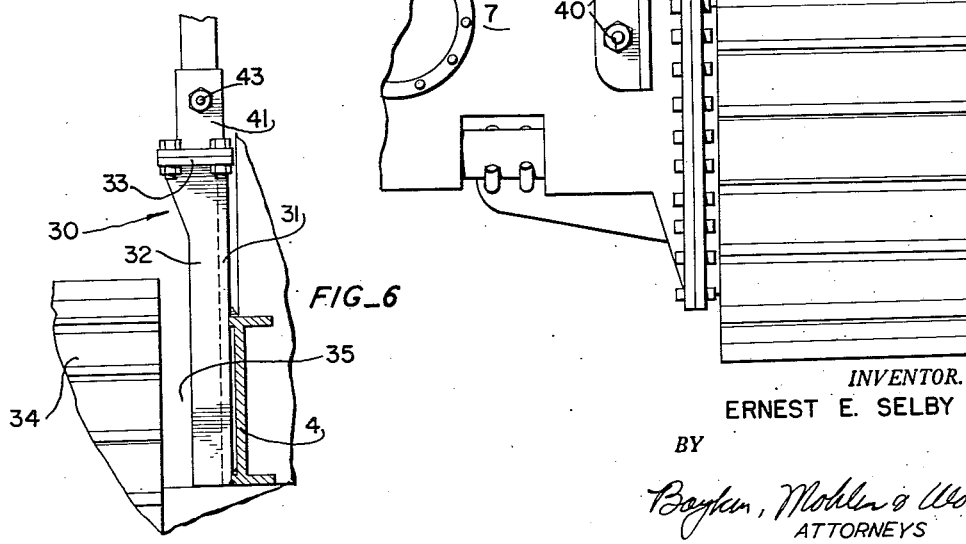
FIG_6
INVENTOR.
ERNEST E. SELBY
BY
Boykin, Mohler & Wood
ATTORNEYS 2,805,887

TRACTOR CANOPY GUARD AND COMBINATION

Ernest E. Selby, Redding, Calif.

Application February 10, 1956, Serial No. 564,699

6 Claims. (Cl. 296—102)

This invention relates to a tractor canopy guard for tractors and to the combination of such a guard and tractor.

Heretofore track laying tractors have been widely employed in the forests and in various industries where considerable danger to the operator exists, for example falling objects such as trees, timbers, etc., and also such tractors have frequently been used in places where they have overturned.

The present invention provides a canopy guard that is simple in structure, rugged and easily installed on a tractor, particularly of the track laying type, and that will afford not only adequate protection for the operator in the event the tractor rolls over or is upset, but that will also afford adequate protection to the operator from falling objects such as trees, timbers, etc., and the provision of such a canopy is one of the objects of this invention.

Another object of the invention is the provision of a canopy guard that enables the operator to safely maneuver a tractor in places and on inclines where it could not otherwise be moved.

In explanation of the above, track laying tractors as used in the lumber industry or forestry service are frequently required to climb or to descend timbered grades that are so steep that the tractors would overturn if moved laterally unless supported. With the present invention the tractor can be supported against the upper side of a tree as it moves laterally past it in a direction up or down a steep grade, and in this manner make progress that would otherwise be impossible.

The present invention also provides protection for the operator in the event the tractor should overturn, provided the operator is able to cling to some support below the canopy, and this is usually possible.

Other objects and advantages will appear in the drawings and description.

In the drawings,

Fig. 1 is a fragmentary side elevational view of a tractor with the present canopy guard thereon.

Fig. 2 is a perspective view of the canopy guard, exclusive of the deflector bars, and with a portion of the tractor shown.

Fig. 3 is an enlarged sectional view taken along line 3—3 of Fig. 1.

Fig. 4 is a fragmentary side elevational view of a tractor showing the means for securing the canopy guard thereto.

Fig. 5 is a fragmentary rear view of one of the rear corners of the tractor showing one of the means for securing one of the rear canopy posts to the tractor.

Fig. 6 is an enlarged sectional view taken along line 6—6 of Fig. 1.

In detail, the conventional track laying tractor is generally designated 1, and this tractor has a horizontally elongated main frame generally designated 2 that includes the engine housing 3 as a part of the same since they are rigidly connected and the housing is a casting that functions as a part of the main frame. Rearwardly of said housing extends horizontally spaced main side frame members 4 (Fig. 6) that are rigid with the rear end 7 (Fig. 5).

The operator's station on the tractor is rearwardly of the engine and is provided with the operator's seat 8, which seat in turn is carried by the main frame to which it may be rigidly secured by conventional cross members or a floor plate rigid with the main frame. This operator's station includes the area rearward of the engine and the engine housing and this station comes within the confines of the canopy guard, which station is protected by said guard.

The canopy guard is generally designated 9 (Figs. 1, 2) and comprises a corresponding pair of horizontally elongated main frame members 10, each having a continuation thereof that provides a vertical post 12 integrally connected with each frame member 10 by an arch or curve 13. Thus each frame member 10, post 12 and arch 13 is a unit formed from a straight piece of steel and each such piece is preferably a box section formed by welding the free longitudinal edges of a pair of angle iron strips together, after which the box section piece is heated to a red heat and bent to provide the arch and post.

Rigidly secured to each of the side frame members 10 adjacent to the forward end thereof (remote from arch 13) is the upper end of a vertical post 14, and each post 14 is preferably also a box section, and a horizontal cross member 15 (Fig. 2) of box section connects the forward ends of the frame members 10. A similar cross member 16 of box section and spaced rearwardly of cross members 15, also connects and spaces the frame members 10 while several spaced tubular cross members 17 are welded at their ends to frame members 10 at points between the cross member 16 and posts 12. The ends of cross members 15, 16 and the upper ends of posts 14 are also preferably welded to the frame members 10.

Directly over the tubular cross members 17 is a relatively heavy gauge metal plate 18 that is welded to the frame members 10 and the lateral edges of this plate extend beyond the frame members 10 to provide deflector elements generally indicated at 20 (Figs. 2, 3). The outer edge of each element 20 extends slantingly outwardly of each element 10 from the forward end of each element to a maximum distance adjacent to the rear edge of each element and then curves back to the frame member at the arch 13. A bar 21 is weldel along the outer edge of each deflector element 20 and a lower plate 22 (Fig. 3) is welded along its edges to the bar 21 and to the lower edge of the frame member 10, while a vertical rectangular web plate 23 between the upper and lower sides of each element 20 is welded to said upper and lower sides to provide a central reinforcement (Fig. 2).

The solid heavy gauge metal plate 18, as seen in Fig. 1, is curved to extend over the upper portion of the curved portions 13 of the canopy frame members as well as over a portion of the frame members 10. Thus it materially contributes to preventing twisting of the canopy about a vertical axis. The curvature of the plate also materially contributes to resisting deformation of the canopy under the severe strains imposed upon it accidentally and intentionally, during operation of the tractor.

Heavy steel netting or screen 25 may be welded to the frame members 10 and to cross members 15, 16 to cover the space between the latter, and similar heavy steel netting 26 may be welded to posts 12 and to upper cross member 17 and a lower cross member 27 to cover the space rearwardly of the operator's seat.

The forward ends of the side frame members 10 project slightly past the upper ends of the posts 14 and each projecting forward end may have an eye 29 welded thereto.

The structure as above described insofar as the canopy guard is concerned is a unit that may be bodily secured to the tractor and removed therefrom.

For securing the canopy guard to the tractor, a pair of forward bench brackets 30 (Figs. 1, 4, 6) are preferably welded to the main side frame members 4 of the tractor.

Each bench bracket 30 comprises a vertically disposed plate 31 (Figs. 4, 6) having several vertical, horizontally spaced reinforcing ribs 32 formed on their outer sides (facing outwardly of each frame member 4) and the upper ends of said ribs are integral with a horizontal bench plate 33. The ribs 32 and plate 31 extend downwardly between the track 34 (Fig. 6) of the tractor and the side frame member 4, and the ribs are relatively narrow where they so extend between said track and the frame in order to provide a relatively wide space 35 so that branches of trees, etc. will not jam between the track and webs.

At the rear end of the main frame and bolted to the end frame member 7 are another pair of bench brackets 37 each having a horizontal bench plate 38 at its upper end. Upon removal of the nuts 40 that secure these brackets to the end 7, access may be had to the rear end of the tractor and to internal parts in said rear end.

Each of the bench plates 33, 38 on each bench bracket 30, 37 is apertured for registration with similar openings in the horizontal base plate of a box socket 41 that is provided for receiving the lower end of each post 12, 14. Bolts 42 removably secure the bench plates and said horizontal base plates together.

Each box socket is rectangular in horizontal cross-sectional contour for loosely receiving the lower end of each post 12, 14 and two of the opposite sides of each socket are formed with axially aligned openings for a bolt 43 that is adapted to pass through an opening formed in the lower end of each post 12, 14 when the lower end of each post is supported on the base plate to which the socket is welded.

When the socket bases are secured to the bench brackets, the canopy guard may be installed by fitting the lower ends of the box section posts 12, 14 in the sockets. As has already been mentioned the sockets are so formed as to relatively loosely receive the posts, instead of making a close fit. After the posts are in the sockets the bolts 43 will releasably secure the posts to the latter. Obviously the sockets can be secured to the posts and then the base plates on the sockets secured to the bench plates. It is quite desirable that the socket plates be removable from the bench plates and that the sockets (and their base plates) be removable from the posts. It frequently occurs that distortions occasioned by trees or logs falling on the canopy guard or distortions due to the tractor overturning will cause the posts to stick in the sockets. By removably securing the base plates on the sockets to the bench plates no difficulty is experienced in removing the canopy guard, but where the canopy guard can be removed or replaced without removing the sockets, and where replacement of the sockets is not necessary it is preferable that the single bolt securing each post in the socket be the only part that needs to be removed.

When the canopy guard is secured to the bench brackets (the latter being on the tractor) forward deflector bars 45 are pivotally secured at one of their ends by pivots 46 to the eyes 29 and the other ends of said bars are pivotally secured by pivots 47 to the upper ends of brackets 48 (Fig. 1) that are rigid with the engine housing portion 3 of the main tractor frame 2.

These deflector bars not only help in stabilizing the main portion of the canopy guard, but tree branches and other objects are deflected upwardly by said bars to pass over the canopy guard as the tractor moves forwardly since said bars extend slantingly upwardly from the forward brackets 48 of said guard.

The deflector elements 20 are quite important since they enable the tractor to slide past a tree while they are in engagement with a tree and while the tractor is supported by the tree through said elements against overturning, an operation that could not be otherwise performed without possible injury to the tractor if at all.

In making the canopy guard after the parts are all welded in assembled position, the welds in particular are annealed by heating to color and cooling, so as to relieve all stresses that would otherwise result in breakage under severe blows or strains.

The provision of the socket connections between the canopy guard and tractor and the bar or link connection between the canopy guard and tractor, as provided for by bars 45, gives a certain necessary degree of flexibility to the canopy guard that prevents breakage or injury thereto under shocks and strains.

The main frame members 10 are described as extending generally horizontally, but, as indicated in Fig. 1, they preferably extend slightly slantingly downwardly from the curved portion 13 of each and generally in combination of the deflector bars 45. The main canopy frame apart from bars 45 is adapted to be used on practically any any standard track laying tractor with different sizes for different sized tractors. The positions of the front brackets 48 may vary with different structures but since bars 45 are pivotally connected to both the front bracket and to the side frame members 10 of the canopy guard, it is immaterial whether the front brackets are higher or lower in one model than another.

When the canopy guard is not used, it is only necessary to remove the four bolts 43 and pivots 47 to receive the canopy guard from the tractor, yet this guard as described is adequate to withstand any strain or blow purposely or accidentally encountered in the operation of the tractor under the most rigorous conditions.

The detailed description is not intended to be restrictive of the invention since various modifications can be made without departing from the scope of the invention as defined in the claims.

I claim:

1. A tractor canopy guard to be secured to the main tractor frame of a tractor for protecting the operator of such tractor at the operator's station on the latter, comprising: a pair of generally horizontally extending, horizontally spaced main top frame members adapted to be positioned above said main tractor frame in positions extending longitudinally of the longitudinal axis of such tractor and which main top frame members have corresponding front ends and corresponding rear ends respectively forwardly and rearwardly of said station when said main top frame members are in said positions, means rigidly interconnecting said main top frame members, means rigid with said main top frame members for supporting them on said main tractor frame, and a pair of elongated deflector elements respectively rigid with each of the members of said pair of main top frame members and projecting laterally outwardly of said pair along the oppositely outwardly facing sides of the latter, the oppositely outwardly facing surfaces of said pair of elements extending divergently relative to each other in direction away from said front ends of said frame members to provide tree engaging surfaces to support a tractor against overturning during movement of a laterally tilted tractor past such tree when said canopy guard is on such tractor.

2. A tractor canopy guard to be secured to the main tractor frame of a tractor for protecting the operator of such tractor at the operator's station on the latter comprising: a pair of generally horizontally extending horizontally spaced main top frame members adapted to be positioned above said main tractor frame in positions extending longitudinally of the longitudinal axis of such tractor and which main top frame members have corresponding front ends and corresponding rear ends respectively forwardly and rearwardly of said station when said main top frame members are in said positions; means rigidly interconnecting said main top frame members, corner posts rigid with said top frame members respectively at each of said front ends and rear ends, horizontal base supports each having an upwardly opening socket formed integrally therewith in which the lower end of each post is removably positioned, means for removably securing the lower ends of said posts in said sockets, bench brackets for each of said base supports, each bench bracket having a vertical plate for rigid securement directly to the main tractor frame and a horizontal bench plate integral with each vertical plate at the upper end of each of said vertical plates, and bolts removably securing each of said base supports on each horizontal bench plate, each of said corner posts and said top frame members being of structural steel and of square box structure in cross sectional contour and each socket being square in cross sectional contour.

3. A canopy guard comprising a pair of corresponding elongated side frame members of box section curved intermediate their ends to provide a horizontally extending portion at one side of the curve of each member and a vertically extending portion at the other side of such curve, tubular cross members rigidly secured at their ends to said members spacing them apart and connecting them, a plate of relatively heavy gauge metal extending substantially over said cross members and over corresponding portions of said horizontally extending portions of said side frame members and partly over said curved portions of the latter, said plate being curved to correspond to the curves of said curved portions and said plate being welded to said side frame members and to said curved portions thereof to reinforce the canopy guard against distortion including twisting about a vertical axis, a pair of vertical posts rigidly secured at their upper ends to the ends of said horizontally extending portions that are remote from said curves, means at the lower ends of said vertically extending portions and at the lower ends of said posts for removably securing them to the main frame of a tractor, said frame members and said vertical posts each being of structural steel and of box structure in cross sectional contour, and said last mentioned means including box socket bases into which the lower ends of said vertically extending portions and the lower ends of said posts extend, means on each of said socket bases releasably securing said lower ends of said vertically extending portions to said socket bases.

4. In combination with a tractor having a main horizontally disposed frame extending from the forward to the rear end thereof and an operator's seat supported thereon adjacent to said rear end, a canopy guard extending over and spaced above said seat, a pair of vertical front posts secured to the front end of said guard nearest the forward end of said frame and depending from said front end, a pair of vertical rear posts secured to the rear end of said guard at the rear end of said frame and depending from said guard, upwardly opening socket bases into which the lower ends of said posts are removably secured, front bench brackets secured to said frame, means for removably securing the socket bases for said front posts to said front bench brackets, a pair of rear bench brackets at the rear end of said frame, means for removably securing said rear bench brackets to said frame and means for removably securing the socket bases for said rear posts to said rear bench brackets, the sockets on said bases and into which said posts removably extend being larger than the lower ends of said posts to provide movement of said posts in said sockets without breaking said socket bases and bolts extending through the sides of said socket bases and through the lower end of each post to releasably hold said posts in said socket bases.

5. In combination with a tractor having a main horizontally exposed frame extending from the forward to the rear end thereof and an operator's seat supported therein adjacent to said rear end, a canopy guard extending over and spaced above said seat, posts securing said canopy to said frame, said canopy guard including deflector elements rigid therewith projecting laterally therefrom and having horizontally elongated surfaces facing laterally oppositely outwardly of said guard and extending divergently in direction from the forward to the rear end of said canopy for engagement with a tree or the like when said tractor is tilted sideways on a slope at the upper side of such tree.

6. In combination with a tractor having a main horizontally elongated tractor frame extending from the forward to the rear end thereof and an operator's seat supported thereon adjacent to said rear end, a canopy guard having a pair of horizontally spaced main side frame members extending longitudinally of said tractor frame and spaced above the opposite lateral sides of said frame, a plate secured to said side frame members and over said operator's seat, the rear ends of said main side frame members extending vertically downwardly to the rear end of said tractor frame providing a pair of rear posts and means for removably securing the lower ends of said rear posts to the rear end of said tractor frame, a pair of vertical front posts secured to the said side frame members at points intermediate the forward and rear ends of said tractor frames and extending to the latter, means for removably securing the lower ends of said front posts to said tractor frame at said points, a pair of bars pivotally secured at one of their ends to said main side frame members at points adjacent to the upper ends of said front posts and means including pivots for connecting the other ends of said bars to said tractor at the forward end of the latter, said bars extending slantingly downwardly from their first mentioned ends, deflector elements rigid with said side frame elements projecting oppositely outwardly from said pair of side frame elements and having oppositely outwardly facing surfaces extending divergently rearwardly from said pair of side frame members.

References Cited in the file of this patent
UNITED STATES PATENTS

| 677,881 | Immler | Feb. 12, 1901 |
| 1,465,712 | Hanson | Aug. 21, 1923 |
| 2,263,978 | Branovic | Nov. 25, 1941 |
| 2,441,132 | Blakey | May 11, 1948 |
| 2,729,462 | Maybrier | Jan. 3, 1956 |